(12) United States Patent
Rosen et al.

(10) Patent No.: US 11,979,332 B2
(45) Date of Patent: May 7, 2024

(54) ADAPTIVE NETWORKING FOR RESILIENT COMMUNICATIONS

(71) Applicant: The MITRE Corporation, McLean, VA (US)

(72) Inventors: Andrew Rosen, Westford, MA (US); Chelsea Georgan, Cambridge, MA (US); Jon Aho, Somerville, MA (US); Venkatesh Ramaswamy, Westford, MA (US)

(73) Assignee: The MITRE Corporation, McLean, VA (US)

( * ) Notice: Subject to any disclaimer, the term of this patent is extended or adjusted under 35 U.S.C. 154(b) by 0 days.

(21) Appl. No.: 16/995,327

(22) Filed: Aug. 17, 2020

(65) Prior Publication Data

US 2022/0052959 A1 Feb. 17, 2022

(51) Int. Cl.
  *H04L 47/70* (2022.01)
  *H04L 41/5025* (2022.01)
  *H04L 43/0811* (2022.01)
  *H04L 43/087* (2022.01)
  *H04W 76/10* (2018.01)
  *H04W 88/06* (2009.01)

(52) U.S. Cl.
  CPC .......... *H04L 47/70* (2013.01); *H04L 41/5025* (2013.01); *H04L 43/0811* (2013.01); *H04L 43/087* (2013.01); *H04W 76/10* (2018.02); *H04W 88/06* (2013.01)

(58) Field of Classification Search
  None
  See application file for complete search history.

(56) References Cited

U.S. PATENT DOCUMENTS

| | | | |
|---|---|---|---|
| 6,134,444 A * | 10/2000 | Kotzin | H04W 36/18 455/442 |
| 2004/0067754 A1* | 4/2004 | Gao | H04W 28/26 455/442 |
| 2019/0361694 A1* | 11/2019 | Gordon | G06F 1/1673 |

OTHER PUBLICATIONS

Johnson et al. "Performance of Routing Protocols in HF Wireless Networks" located at https://ieeexplore.ieee.org/document/1605997, visited on May 21, 2020. (7 pages).

* cited by examiner

*Primary Examiner* — Christine T Duong
(74) *Attorney, Agent, or Firm* — Morrison & Foerster LLP

(57) ABSTRACT

A system for establishing and maintaining a communications network includes: one or more programs including instructions for: receiving a first set of data associated with a first set of communication links, the first set of communication links configured to establish connection between devices; receiving a second set of data associated with a second set of communication links; receiving a determination of whether one or more communication links of the first set satisfy a pre-determined quality level; receiving a determination of whether one or more communication links of the second set satisfy the pre-determined quality level; receiving a selection from the one or more communication links of the second set that have been determined to satisfy the pre-determined quality level; and connecting the devices via the selected one or more communication links if one or more communication links of the first set is determined to not satisfy the pre-determined quality level.

62 Claims, 6 Drawing Sheets

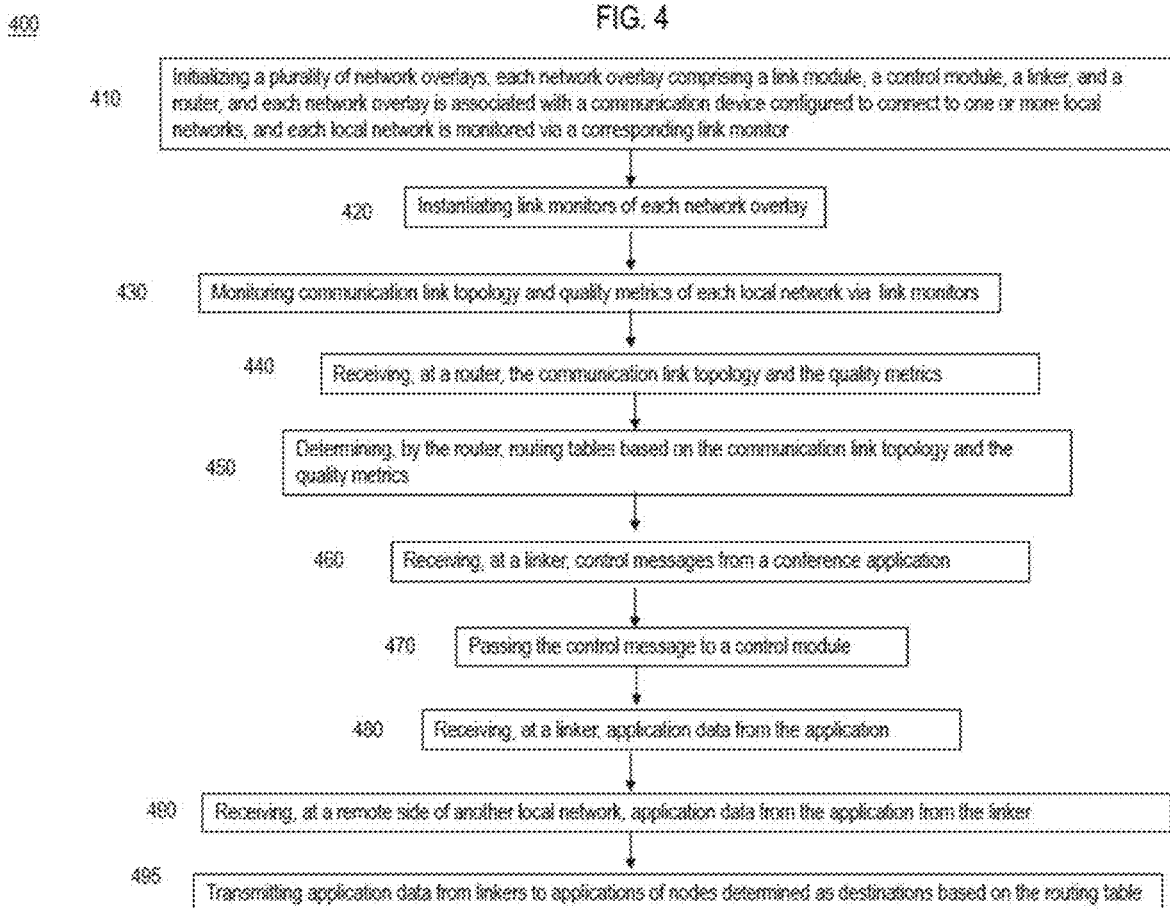

510 — monitoring employed communication links between communication devices and local networks associated with the global network

520 — determining whether the employed communication links and whether alternate communication links satisfy a pre-determined quality level of the conference application

530 — if one or more of the employed communication links is determined to not satisfy the pre-determined quality level, then connecting to one or more alternate communication links that are determined to satisfy the pre-determined quality level

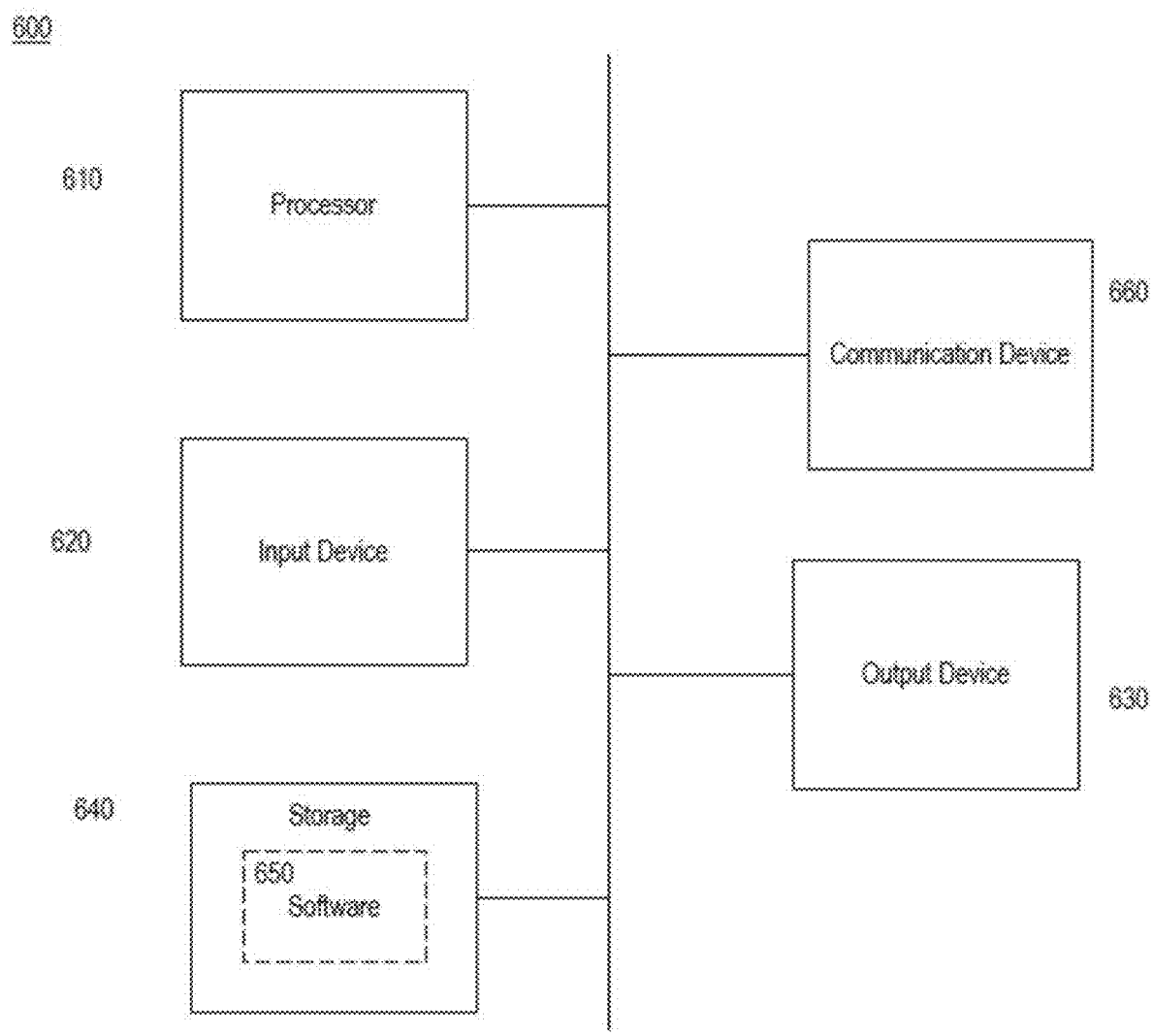

ADAPTIVE NETWORKING FOR RESILIENT COMMUNICATIONS

STATEMENT AS TO FEDERALLY SPONSORED RESEARCH

This invention was made with government support under Grant No. W56KGU18D0004 awarded by the United States Department of Defense. The government has certain rights in the invention.

FIELD OF THE DISCLOSURE

The present invention relates to methods and systems for establishing and maintaining a network, specifically maintaining a networking amongst participants by monitoring and assessing a health of employed communication links and alternative communication links. The alternative communication links may be employed to maintain a quality communication across the network.

BACKGROUND OF THE DISCLOSURE

Conferencing applications for voice calling, video calling and/or messaging services may be subject to network disruptions during a conference communication. Network disruptions during a conference communication can degrade the quality of the conference and quality of the conferencing experience for participants. Network disruptions can include, for example, latency, jitter, packet error rate, dropped communication, or an adversarial attack. Such disruptions may interrupt communication links of a network or cause the communication links of a network to fail. Local networks experiencing disruptions may, for example, degrade the quality of the conference for one or more participants or may prevent one or more participants from joining the conference. To prevent such interruptions or failures, current communication technologies implement protocols to switch from a first communication link to a second communication link to circumvent the detected disruptions of the first communication link.

It is known in the art to establish a "make-before-break" connection in response to network disruptions. The make-before-break employs a protocol that connects a communication device (such as a mobile device) to multiple communication links at the same time to aid in the transition from the first communication link to the second communication link. That is, the communication device connects to the second communication link before the first communication link is lost, hence "make-before-break." The make-before-break protocol does not test the second communication link for network disruptions prior to connecting to the second communication link.

In the mobile device communication industry, the connection to multiple communication links at the same time can be established via multiple radio access technology (multi-RAT). Multi-RAT describes fixed communication in that the communication links accessible via multi-RAT are limited to designated networks that share similar communication technology. For example, if the set-up configuration of multi-RAT on a mobile device designates only 4G and 5G possible networks, then the mobile device is fixed to establish communication links only to 4G and 5G networks.

SUMMARY OF THE DISCLOSURE

As described above, multiple communication links, each associated with a local network, may be used to maintain a communications network across communication devices. A communication device that has access to the multiple local networks via multiple connection links can avoid interruptions or communication failure within a communications network. Current technologies use multiple connections to employ a make-before-break protocol in response to network disruptions of a first communication link associated with a first local network. The make-before-break protocol connects a communication device to a second communication link associated with a second local network while the communication device remains connected to the first communication link.

However, for current technologies, the second communication link is established without first assessing whether the second communication link is reliable or suitable for providing a pre-determined level of communication quality. Without assessment of the second communication link, it is possible that the second communication link does not satisfy the pre-determined level of communication quality. For example, if the second communication link includes disruptions that degrade communication quality below the pre-determined level of communication quality, then switching from the first communication link to the second communication link will not improve communication quality. Instead, it may maintain the poor quality of the first communication link or further degrade communication quality. Therefore, current technology that establishes the second communication link without first assessing the quality of the second communication link does not sustain quality conferencing. Furthermore, current technologies do not allow for dynamically establishing the second communication link if the second communication link is associated with a second local network that uses a communication technology type different from the communication technology type of the first communication link.

The systems and methods described herein provide a communications network that adapts to sustain a pre-determined level of communication quality for a conferencing application should the employed communication links indicate that communication quality may degrade below the pre-determined level. The communications network may adapt by transitioning to alternate communication links that have been confirmed to satisfy the pre-determined level of communication quality. The employed communication links may be from a first set of communication links and the alternate communication links may be from a second set of communication links. In some embodiments, the alternate communication links may not be actively used by the communication devices prior to determining whether the alternate communication links satisfy the pre-determined quality level. In some embodiments, if the employed communication links actively being used by the communication devices are determined to no longer satisfy the pre-determined quality level, then alternate communication links that are not actively being used by the communication device, but have been determined to satisfy the pre-determined quality level may be used to establish communication between the communication devices. To facilitate a smooth transition from the employed communication links to the alternate communication links, connections to the alternate communication links may be established before breaking connections to the employed communication links.

In some embodiments, the pre-determined level of communication quality may be network specifications that allow the application to operate as intended. Network specifications may include quality of service features that specify, for example, a tolerance level of packet error rate that is suitable for quality conferencing via the conference application. In some embodiments, the communications network may be sustained to provide quality conferencing for a plurality of participants that are not geographically co-located. In some embodiments, the participants may have access to different radio connections. In some embodiments, the network may maintain a topology of participants over a duration (such as days, weeks, or months) of a conference.

In some embodiments, a system for establishing and maintaining a communications network, includes: one or more processors; memory; one or more programs configured for execution by the one or more processors, the one or more programs including instructions for: receiving a first set of data associated with a first set of communication links, wherein the first set of communication links is configured to establish a connection between a plurality of communication devices via one or more local networks associated with the communications network; receiving a second set of data associated with a second set of communication links; receiving a determination of whether one or more communication links of the first set of communication links satisfy a pre-determined quality level; receiving a determination of whether one or more communication links of the second set of communication links satisfy the pre-determined quality level; receiving a selection from the one or more communication links of the second set of communication links that have been determined to satisfy the pre-determined quality level; and connecting the plurality of communication devices via the selected one or more communication links of the second set of communication links if one or more communication links of the first set of communication links is determined to not satisfy the pre-determined quality level.

In any of these embodiments, the first set of communication links and the second set of communication links may be associated with a plurality of different communication technologies. In any of these embodiments, the plurality of different communication technologies may include one or more of high frequency (HF) communication technology, 4G radio communication technology, 5G radio communication technology, WI-FI communication technology, and an IP-based network protocol communication technology.

In any of these embodiments, the selection of the one or more communication links of the second set of communication links may be configured to maximize the communications network quality based on the determination of whether the one or more communication links of the first set of communication links and the one or more communication links of the second set of communication links satisfy the pre-determined quality level.

In any of these embodiments, connecting the plurality of communication devices via the selected one or more communication links of the second set of communication links may include implementing a make-before-break protocol that connects the plurality of communication devices via the selected one or more communication links of the second set of communication links before disconnecting the one or more communication links of the first set of communication links that have been determined to not satisfy the pre-determined quality level. In any of these embodiments, the first set of communication links may be actively used by the plurality of communication devices and the second set of communication links may not be actively used by the plurality of communication devices until the make-before-break protocol is implemented.

In any of these embodiments, upon connecting the plurality of communication devices via the selected one or more communication links of the second set of communication links, application data may be transmitted via the selected one or more communication links of the second set of communication links.

In any of these embodiments, connecting the plurality of communication devices via the selected one or more communication links of the second set of communication links may establish communication amongst the plurality of communication devices using a plurality of different communication technologies associated with one or more of the local networks.

In any of these embodiments, the one or more programs may include instructions for disconnecting the plurality of communication devices from the one or more communication links of the first communication links that have been determined to not satisfy the pre-determined quality level after connecting the communication devices via the selected one or more communication links of the second set of communication links.

In any of these embodiments, the determination of whether the one or more communication links of the first set of communication links satisfy the pre-determined quality level may include an assessment of whether the one or more communication links of the first set of communication links are degrading towards a level below the pre-determined quality level.

In any of these embodiments, the pre-determined quality level may include network specifications that allow a conferencing application to operate as intended.

In any of these embodiments, the pre-determined quality level may include thresholds for quality of service features for conferencing, the quality of service features include one or more of packet error rate, latency, throughput, and jitter.

In any of these embodiments, the system may include a plurality of network overlays, wherein each communication device of the plurality of communication devices is associated with a network overlay of the plurality of network. In any of these embodiments, each network overlay may include a linker, a router, one or more link monitors, and a control module. In any of these embodiments, the linker may be configured to receive the first set of data, the second set of data, and the pre-determined quality level. In any of these embodiments, the linker may be configured to: receive application data, receive conference quality data associated with the monitored quality of service features from the one or more link monitors, transmit the quality data to the router configured to select if one or more communication links from the second set of communication links should be used based on conference quality data and to generate a routing table based on the selection, receive the routing table from the router, and transmit the application data to a next destination based on the routing table.

In any of these embodiments, wherein the linker is configured to receive quality data from the one or more link monitors, the quality data received from the one or more link monitors is associated with performance of the first set of communication links and performance of the second set of communication links based on quality of service features, wherein the quality of service features include one or more of packet error rate, latency, throughput, and jitter. In any of these embodiments, the linker may be configured to receive application data and transmit the application data to another linker of another network overlay via one or more communication links from the first set of communication links or the second set of communication links. In any of these embodiments, the linker may be configured to receive control messages from outside the network overlay, pass the control messages to the control module, receive a response to the control messages from control module, and transmit the response outside the network overlay. In any of these embodiments, the network overlay may be configured to dynamically add one or more additional link monitors to monitor one or more other local networks as they become available.

In some embodiments, a method for establishing and maintaining a communications network, includes: receiving a first set of data associated with a first set of communication links, wherein the first set of communication links is configured to establish a connection between a plurality of communication devices via one or more local networks associated with the communications network; receiving a second set of data associated with a second set of communication links; receiving a determination of whether one or more communication links of the first set of communication links satisfy a pre-determined quality level; receiving a determination of whether one or more communication links of the second set of communication links satisfy the pre-determined quality level; receiving a selection from the one or more communication links of the second set of communication links that have been determined to satisfy the pre-determined quality level; and connecting the plurality of communication devices via the selected one or more communication links of the second set of communication links if one or more communication links of the first set of communication links is determined to not satisfy the pre-determined quality level.

In any of these embodiments, the first set of communication links and the second set of communication links may be associated with a plurality of different communication technologies. In any of these embodiments, the plurality of different communication technologies may include one or more of high frequency (HF) communication technology, 4G radio communication technology, 5G radio communication technology, WI-FI communication technology, and an IP-based network protocol communication technology.

In any of these embodiments, the selection of the one or more communication links of the second set of communication links may be configured to maximize the communications network quality based on the determination of whether the one or more communication links of the first set of communication links and the one or more communication links of the second set of communication links satisfy the pre-determined quality level.

In any of these embodiments, connecting the plurality of communication devices via the selected one or more communication links of the second set of communication links may include implementing a make-before-break protocol that connects the plurality of communication devices via the selected one or more communication links of the second set of communication links before disconnecting the one or more communication links of the first set of communication links that have been determined to not satisfy the pre-determined quality level. In any of these embodiments, the first set of communication links may be actively used by the plurality of communication devices and the second set of communication links may not be actively used by the plurality of communication devices until the make-before-break protocol is implemented.

In any of these embodiments, upon connecting the plurality of communication devices via the selected one or more communication links of the second set of communication links, application data may be transmitted via the selected one or more communication links of the second set of communication links.

In any of these embodiments, connecting the plurality of communication devices via the selected one or more communication links of the second set of communication links may establish communication amongst the plurality of communication devices using a plurality of different communication technologies associated with one or more of the local networks.

In any of these embodiments, the method may include disconnecting the plurality of communication devices from the one or more communication links of the first communication links that have been determined to not satisfy the pre-determined quality level after connecting the communication devices via the selected one or more communication links of the second set of communication links.

In any of these embodiments, the determination of whether the one or more communication links of the first set of communication links satisfy the pre-determined quality level may include an assessment of whether the one or more communication links of the first set of communication links are degrading towards a level below the pre-determined quality level.

In any of these embodiments, the pre-determined quality level may include network specifications that allow a conferencing application to operate as intended.

In any of these embodiments, the pre-determined quality level may include thresholds for quality of service features for conferencing, the quality of service features include one or more of packet error rate, latency, throughput, and jitter.

In any of these embodiments, each communication device of the plurality of communication devices may be associated with a network overlay of a plurality of network overlays. In any of these embodiments, each network overlay may include a linker, a router, one or more link monitors, and a control module. In any of these embodiments, the linker may be configured to receive the first set of data, the second set of data, and the pre-determined quality level. In any of these embodiments, the linker may be configured to: receive application data, receive conference quality data associated with the monitored quality of service features from the one or more link monitors, transmit the quality data to the router configured to select if one or more communication links from the second set of communication links should be used based on conference quality data and to generate a routing table based on the selection, receive the routing table from the router, and transmit the application data to a next destination based on the routing table. In any of these embodiments, the linker may be configured to receive quality data from the one or more link monitors, the quality data received from the one or more link monitors is associated with performance of the first set of communication links and performance of the second set of communication links based on quality of service features, wherein the quality of service features include one or more of packet error rate, latency, throughput, and jitter. In any of these embodiments, the linker may be configured to receive application data and transmit the application data to another linker of another network overlay via one or more communication links from the first set of communication links or the second set of communication links. In any of these embodiments, the linker may be configured to receive control messages from outside the network overlay, pass the control messages to the control module, receive a response to the control messages from control module, and transmit the response outside the network overlay. In any of these embodiments, the network overlay may be configured to dynamically add one or more additional link monitors to monitor one or more other local networks as they become available.

In some embodiments, a non-transitory computer readable storage medium storing one or more programs, the one or more programs configured to establish and maintain a communications network, the one or more programs including instructions, which when executed by an electronic device, cause the device to: receive a first set of data associated with a first set of communication links, wherein the first set of communication links is configured to establish a connection between a plurality of communication devices via one or more local networks associated with the communications network; receive a second set of data associated with a second set of communication links; receive a determination of whether one or more communication links of the first set of communication links satisfy a pre-determined quality level; receive a determination of whether one or more communication links of the second set of communication links satisfy the pre-determined quality level; receive a selection from the one or more communication links of the second set of communication links that have been determined to satisfy the pre-determined quality level; and connect the plurality of communication devices via the selected one or more communication links of the second set of communication links if one or more communication links of the first set of communication links is determined to not satisfy the pre-determined quality level.

In any of these embodiments, the first set of communication links and the second set of communication links may be associated with a plurality of different communication technologies. In any of these embodiments, the plurality of different communication technologies may include one or more of high frequency (HF) communication technology, 4G radio communication technology, 5G radio communication technology, WI-FI communication technology, and an IP-based network protocol communication technology.

In any of these embodiments, the selection of the one or more communication links of the second set of communication links may be configured to maximize the communications network quality based on the determination of whether the one or more communication links of the first set of communication links and the one or more communication links of the second set of communication links satisfy the pre-determined quality level.

In any of these embodiments, the connection of the plurality of communication devices via the selected one or more communication links of the second set of communication links may include implementation of a make-before-break protocol that connects the plurality of communication devices via the selected one or more communication links of the second set of communication links before disconnection of the one or more communication links of the first set of communication links that have been determined to not satisfy the pre-determined quality level. In any of these embodiments, the first set of communication links may be actively used by the plurality of communication devices and the second set of communication links may not be actively used by the plurality of communication devices until the make-before-break protocol is implemented.

In any of these embodiments, upon the connection of the plurality of communication devices via the selected one or more communication links of the second set of communication links, application data may be transmitted via the selected one or more communication links of the second set of communication links.

In any of these embodiments, the connection of the plurality of communication devices via the selected one or more communication links of the second set of communication links may establish communication amongst the plurality of communication devices using a plurality of different communication technologies associated with one or more of the local networks.

In any of these embodiments, the one or more programs may include instructions, which when executed by an electronic device, cause the device to disconnect the plurality of communication devices from the one or more communication links of the first communication links that have been determined to not satisfy the pre-determined quality level after connection of the communication devices via the selected one or more communication links of the second set of communication links.

In any of these embodiments, the determination of whether the one or more communication links of the first set of communication links satisfy the pre-determined quality level may include an assessment of whether the one or more communication links of the first set of communication links are degrading towards a level below the pre-determined quality level.

In any of these embodiments, the pre-determined quality level may include network specifications that allow a conferencing application to operate as intended.

In any of these embodiments, the pre-determined quality level may include thresholds for quality of service features for conferencing, the quality of service features include one or more of packet error rate, latency, throughput, and jitter.

In any of these embodiments, each communication device of the plurality of communication devices may be associated with a network overlay of a plurality of network overlays. In any of these embodiments, each network overlay may include a linker, a router, one or more link monitors, and a control module. In any of these embodiments, the linker may be configured to receive the first set of data, the second set of data, and the pre-determined quality level. In any of these embodiments, the linker may be configured to: receive application data, receive conference quality data associated with the monitored quality of service features from the one or more link monitors, transmit the quality data to the router configured to select if one or more communication links from the second set of communication links should be used based on conference quality data and to generate a routing table based on the selection, receive the routing table from the router, and transmit the application data to a next destination based on the routing table. In any of these embodiments, the linker may be configured to receive quality data from the one or more link monitors, the quality data received from the one or more link monitors is associated with performance of the first set of communication links and performance of the second set of communication links based on quality of service features, wherein the quality of service features include one or more of packet error rate, latency, throughput, and jitter. In any of these embodiments, the linker may be configured to receive application data and transmit the application data to another linker of another network overlay via one or more communication links from the first set of communication links or the second set of communication links. In any of these embodiments, the linker may be configured to receive control messages from outside the network overlay, pass the control messages to the control module, receive a response to the control messages from control module, and transmit the response outside the network overlay. In any of these embodiments, the network overlay may be configured to dynamically add one or more additional link monitors to monitor one or more other local networks as they become available.

In addition, it is also to be understood that the singular forms "a", "an," and "the" used in the following description are intended to include the plural forms as well, unless the context clearly indicates otherwise. It is also to be understood that the term "and/or," as used herein, refers to and encompasses any and all possible combinations of one or more of the associated listed items. It is further to be understood that the terms "includes," "including," "comprises," and/or "comprising," when used herein, specify the presence of stated features, integers, steps, operations, elements, components, and/or units, but do not preclude the presence or addition of one or more other features, integers, steps, operations, elements, components, units, and/or groups thereof.

In the following description of the disclosure and embodiments, reference is made to the accompanying drawings in which are shown, by way of illustration, specific embodiments that can be practiced. It is to be understood that other embodiments and examples can be practiced, and changes can be made, without departing from the scope of the disclosure.

BRIEF DESCRIPTION OF THE DRAWINGS

The invention will now be described, by way of example only, with reference to the accompanying drawings, in which:

FIG. 4 shows an exemplary flowchart of an exemplary method of sustaining a network for resilient communications, according to some embodiments.

FIG. 5 illustrates an exemplary flowchart of an exemplary method for sustaining a communications network, according to some embodiments.

FIG. 6 illustrates an example of a computing device according to examples of the disclosure.

DETAILED DESCRIPTION OF EXEMPLARY EMBODIMENTS

Figure 1:
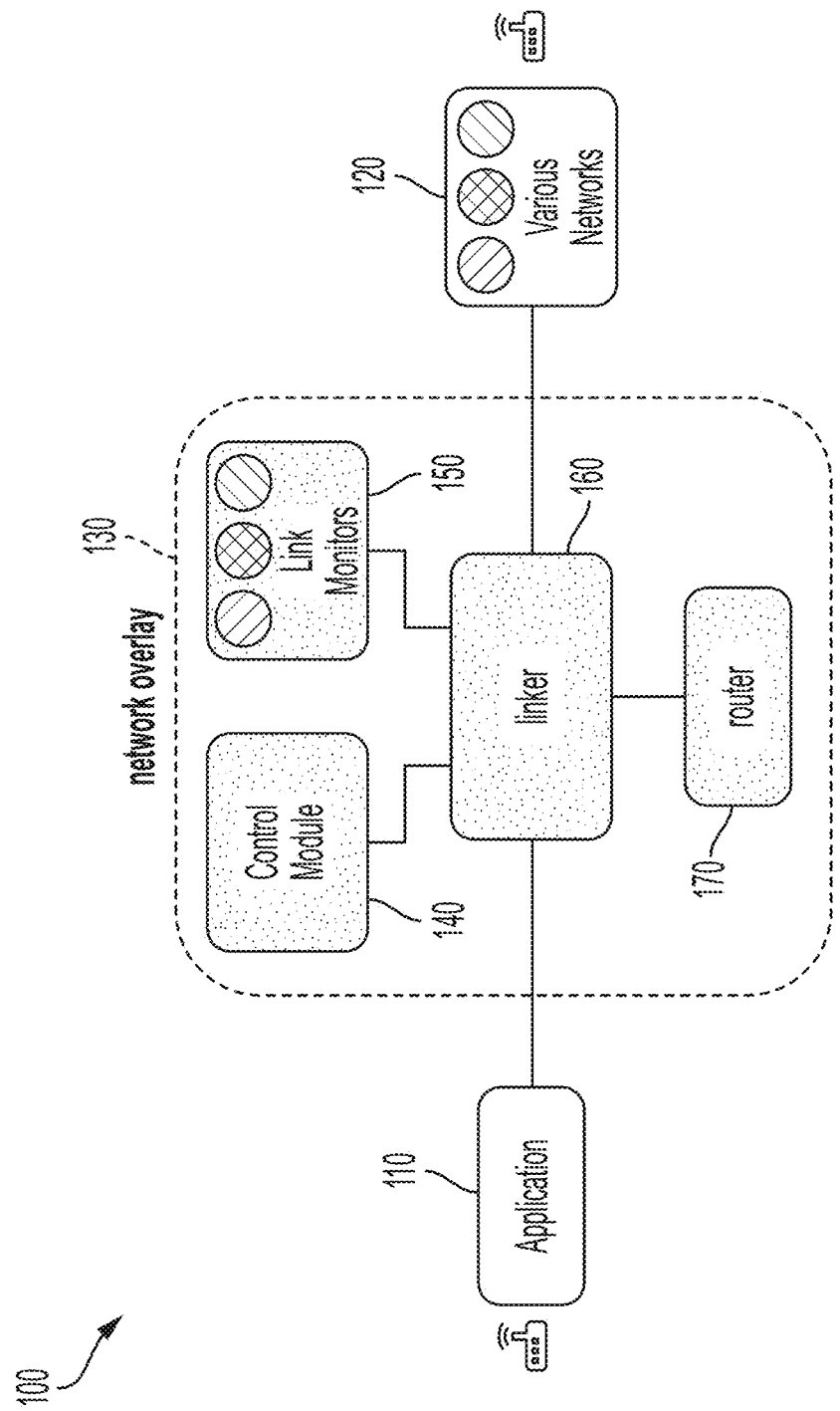
FIG. 1 illustrates an exemplary schematic of a system that includes an application connected to various networks via a network overlay, according to some embodiments.

Described herein are systems and methods for establishing a dynamically adaptable network that provides quality communication across a plurality of participants using communication devices available to the participants. One or more participants may have access to communication devices that employ a communication technology type different from the communication technology type employed by communication devices used by other participants. For example, 4G and 5G radios may be a first communication type that is different from a second communication type such as high-frequency radios. In general, communication technologies may include, for example, 5G, WI-FI, satellite, high-frequency, communication radios. The systems and methods described herein may be radio agnostic and utilize any radio capable of IP connection.

In some embodiments, the communications network may provide quality communication for each participant by bridging a heterogeneous mix of communication technology available locally to one or more participants. In some embodiments quality communication may be based on a pre-determined quality threshold of quality of service features. The quality of service features and the pre-determined quality threshold may be application specific and the communications network may be adaptable to provide the pre-determined quality threshold for a conference application using the network. Quality of service features may include, for example, restrictions on an acceptable amount of latency, throughput, jitter, and packet error rate to maintain a level of quality during the conference. An example of a pre-determined quality threshold for a conference application may be that an application specifies that a latency of 100 milliseconds or less enables the application to operate smoothly, or that an application specifies jitter to stay below 1 millisecond.

In some embodiments, to provide quality communication, the local networks of a communications network may be monitored and assessed to determine if the associated communication links satisfy the pre-determined quality threshold specified by a conference application using the communications network. Alternate communication links may also be monitored and assessed as possible communication links. In some embodiments, in the event that one or more of the employed communication links show an indication of being no longer able to satisfy the pre-determined quality threshold specified by a conference application using the communications network, then the communication device may connect to alternate communication links that have already been assessed and determined to satisfy the pre-determined quality threshold. In some embodiments, to facilitate smooth transition, a communication device associated with the unsatisfactory communication link may connect to the alternate communication link while the communication device is still connected to the unsatisfactory communication link. In some embodiments, the communication device connects to the alternate communication link before the conference participants can notice a degradation of quality in conferencing communication. In some embodiments, the newly connected alternate communication links may be used for transmitting application data of the conferencing application at or above the pre-determined quality level.

In some embodiments, participants may communicate across the communications network via one or more central communication devices configured to bridge across a heterogeneous mix of communication technologies. In some embodiments, a central communication device may receive data from a first communication device via a first communication technology (such as a satellite radio) and forward the received data to a second communication device via second communication technology (such as an HF radio). In this way, the central communication device is configured to integrate communication across different communication technologies. For example, Participant A may only have access to a satellite radio. Participant B may have access to satellite and HF radio radios. Participant C may only have access to an HF radio. For Participants A, B, and C to communicate, the communication device of Participant B may serve as a node to forward traffic connections to Participants A and C. Such ability to communication communicate across a heterogeneous mix of communication technologies diversifies the communication which adds redundancy and resiliency to the communication.

In some embodiments, sustaining the communications network may include employing an optimized link state routing (OLSR)-based protocol configured to determine available communication devices of the participants, determine available communication links at local networks, determine a health of the available communication links, and in the event of disruptions, configured to connect the communication devices to one of the available communication links determined to have an acceptable health. The health may be based on whether the communication link provides a pre-determined level of quality of service features. In some embodiments, the health may be determined based on metrics associated with the quality of service features. In some embodiments, the determined health of the network may indicate whether the network communication is degrading, stagnant, or improving compared to the pre-determined quality threshold for the conference application.

The systems and methods described herein may sustain the communications network by utilizing an OLSR-based protocol that offers several advantages over traditional OLSR protocols. The OLSR-based protocol described herein may dynamically monitor communication links of local networks that may use heterogeneous communication technologies. The monitored data may be received from each local network and be used to assess how to sustain or improve the performance of the communications network based on the monitored data from each local network. In some embodiments, the OLSR-based protocol described herein looks at the heterogeneous monitoring picture for informing a decision of whether or not to connect to an alternate communication link. In some embodiments, this informed decision may maximize the quality of the service features of the network. For example, the OLSR-based protocol may monitor a global picture of local options available to each communication device, assess a corresponding health of each local option, and determine "how do I maximize quality of service for the duration of this call between my local options." In some embodiments, the dynamic monitoring of local networks may be leveraged towards decision making regarding make-before-break connections. In some embodiments, the network may be sustainable and adaptable to connect to an alternate communication link if the current communication link is unable to provide the pre-determined quality threshold for quality of service features for smooth execution of a conference application.

In some embodiments, a system may include various local networks through which a conference application may establish communication amongst a plurality of participants. The local networks may make up a communications network. The conferencing application may include voice calling, video calling and/or messaging services. The conferencing application may include network specifications that when satisfied establishes an acceptable quality of communication for the participants. The system may include a network overlay that bridges the conference application and various local networks. The network overlay may be configured to adapt the network as necessary to satisfy the network specifications of the conferencing application. For example, in the event the application includes network specifications, the control module of the network overlay may provide the corresponding signals to ensure the network specifications are satisfied at the application level. In this way, the application is not interrupted or degraded due to a failure to satisfy the network specifications of the application.

FIG. 1 illustrates an exemplary schematic of a system 100 that includes an application 110 configured to connect to one or more networks 120 to establish conference communication between users of the application 110 that are not geographically collocated. The application 110 may include network specifications that allow the application 110 to operate as intended. In some embodiments, the application 110 may support, for example, one or more of communication services such as audio calling, video calling, and messaging. In some embodiments, the one or more networks 120 may implement different communication technologies. For example, one local network may implement HF radios, another network may implement satellite radios, and yet another network may implement 5G radios.

In some embodiments, the connection between the application 110 and the one or more networks 120 may be controlled by a network overlay 130. The network overlay 130 may manage links across heterogeneous and dynamic networks to intelligently improve quality-of-service and resiliency for critical applications. The network overlay 130 may manage links by monitoring link performances and balancing application loads. Without the network overlay 130, the application may blindly attempt to establish communication links with the one or more networks 120. Specifically, the network overlay 130 may control an initiation of communication among the users of the application 110 and may control which communication links are employed between the application 110 and the one or more networks 120 as necessary to sustain a pre-determined quality of communication. In some embodiments, the pre-determined quality of communication may be received by the network overlay 130 from the application 110. The pre-determined quality of communication may include network specifications for operating the application 110. The network specifications may be determined a priori to initiation of the network overlay 130. The network specifications may be specified by a user in a configuration file. In some embodiments, a general set of network specifications application to one or more applications may be specified. In some embodiments, the network overlay may include a control module 140, one or more link monitors 150, a linker 160, and a router 170, all of which may be configured to play a role in sustaining the pre-determined quality of communication throughout a conference communication between users of the application 110.

In some embodiments, to initiate communication between users of the application 110, the linker 160 of the network overlay 130 may receive one or more control messages from the application 110. The linker 160 may send the one or more control messages to the control module 140 of the network overlay 130. The control module 140 may be configured to determine if the application 110 requests a response to one or more control messages to set up communication between the users. If the control module 140 determines that a response is requested, then the control module 140 may respond to the application 110 via the linker 160. In some embodiments, communication may be initiated without receiving control messages at the linker 160 that requests a response from the control module 140.

In some embodiments, once the communication is initiated, the linker 160 of the network overlay 130 may receive application data from the application 110. The linker 160 may determine the next destination of the application data based on a routing table generated by the router 170. If the application data has multiple next destinations, the linker 160 may copy the application data and route the copied data according the routing table generated by the router 170. In some embodiments, the routing table may inform the linker 160 which available network to use to maximize quality of service for the call. In some embodiments, the router 170 may fill the routing table based on topology and quality metrics of the employed communication links and alternate communication links provided to the router 170 by one or more link monitors 150 of the network overlay 130. The topology and quality metrics may include a determination of whether the employed communication links and alternate communication links satisfy the pre-determined level of communication quality applicable to the application 110. The topology and quality metrics may include, for example, metrics that the network provides the application with a latency of 100 milliseconds or less, or metrics that the network provides communication with jitter below 1 millisecond. In some embodiments, the pre-determined level of communication quality may be based on, for example, latency, throughput, jitter, and error rates of the communication links. In some embodiments, the one or more link monitors 150 may be configured to provide to the router 170 hashed unique ID generated at system instantiation and an understanding of available users.

In some embodiments, the router may be configured to determine which communication link should be employed to sustain the pre-determined communication quality. If the employed communication links indicate an unacceptable degradation of communication quality, then the alternate communications links that have been assessed and determined to satisfy the pre-determined quality of communication may be employed. Application data of the conferencing application may be transmitted via the newly employed alternate communication links. In some embodiments, the unacceptable degradation may be a drop in communication quality below the pre-determined level of communication. In some embodiments, the unacceptable degradation may include, for example, a latency above 100 milliseconds when an application specifies that a latency of 100 milliseconds or less enables the application to operate smoothly, or jitter above 1 millisecond when an application specifies jitter to stay below 1 millisecond. In some embodiments, to facilitate a smooth transition, the alternate communication links may be employed before breaking the originally employed communication links.

In some embodiments, the next destination may be a communication device that corresponds to a different user using the application 110. In some embodiments, the linker 160 may send the application data to the next destination by sending the application data outside of the network overlay 130 to another linker of another network overlay that corresponds to the communication device of the next destination. The application data may be received at the other linker of the other network overlay and be sent by the other linker outside the other network overlay to the corresponding communication device.

As described above, the control module 140, the link monitors 150, the linker 160, and router 170 may be configured to initiate communication and sustain the pre-determined quality of communication throughout a conference communication between users of the application 110. More detailed descriptions of each module 140, 150, 160, 170 of the network overlay 130 is provided below.

In some embodiments, a control module 140 may be configured to establish communication for a conference application 110. The conference application may be, for example, zoom, skype, telephones, or radios. The control module 140 may be configured to handle channel availability of networks 120 and control plane communication using modules 140, 150, 160, 170 of the network overlay 130 and remote nodes (such as those associated with an application 110). The control module 140 may be configured to send the linker 160 packets destined for the networks 120. In some embodiments, the packets may include channel and status information of the networks 120. The control module 140 may be configured to process commands to establish a communication for the conference application 110. In some embodiments, the control module 140 may be configured to receive commands from a variety of different communication technologies, thus making the operations of the control module 140 radio agnostic. In some embodiments, the control module 140 may be configured to receive commands from an application 110, process the commands, generate responses that satisfy the commands, and transmit the generated responses. In some embodiments, the generated responses may be associated with network realignment configured to satisfy network specifications set by the application 110. In some embodiments, if a control module 140 of the network overlay 130 determines there is a need for network realignment, then the control module 140 of the network overlay 130 may send network realignment information via linker 160 to another linker of another network overlay to synchronize a realignment between both the network overlays. In some embodiments, the network realignment information may include channel availability and status information of the networks 120. In some embodiments, the need for network realignment may include that one or more of the active networks 120 may not provide network connectivity that satisfies the pre-determined quality level to allow the application 110 to operate as intended. In some embodiments, the need for network realignment may include one or more of connecting new users and balancing new loads.

In some embodiments, the control module 140 may be configured to bridge networks across multiple radios. For example, in the case where two nodes are trying to communicate, but lack a direct connection, a bridged node may be elected by the control module 140. The bridged node may be configured to relay information through its linker to each remote node.

The linker may use routes established by the router to avoid sending data to a destination that has already received the data. Based on the routes, the linker of a bridged node may notify some participants using a given network to avoid listening to specific channels of that given network. This will prevent participants from hearing multiple copies of the same data that the bridged node is supplying to other participants of the given network.

In some embodiments, the control module 140 may be configured to control the application topology configuration to sustain a connection to a bridged node and to keep as many users of the application 110 connected as possible. In some embodiments, the control module 140 may be configured to focus the topology around a user or group of users at a higher cost i.e. extra latency or higher bit error rate (BER). In some embodiments, the control module 140 may be configured to focus the topology around a primary group of users at a higher cost for a secondary group of users.

In some embodiments, the linker 160 may be a module that passes information within the network overlay 130, between the application 110 and the network overlay 130, and between the network overlay 130 and other network overlays. In some embodiments, the linker 160 may be configured to load a configuration file. In some embodiments, the configuration file may be generated in the application 110 by a user. The configuration file may include link information describing communication links that the linker 160 may use to pass application data. In some embodiments, the linker 160 may instantiate (initialize/create interfaces within the system) interfaces to the available communication links and provide the interfaces to other modules of the network overlay 130.

In some embodiments, the linker 160 may buffer any network inconsistencies so that the network overlay 130 may be radio agnostic. Network inconsistencies may be variations in network quality produced by underlying networks. In some embodiments, the linker 160 may be configured to allow for expandability in the future when new connections are made available. This may be accomplished, for example, by configuring the linker 160 to treat any network as a generic data connection and buffer any natural latency or jitter on the link to provide the end user with a clean flow of data. In some embodiments, the new connections may be incorporated dynamically into the network overlay 130 via the linker. For example, in response to a network specification for the application 110, linker 160 may buffer disruptions to the link and if the linker 160 cannot buffer as needed, then another network 120 is selected based on information from the link monitors 150.

In some embodiments, the one or more link monitors 150 of a network overlay 130 may be configured to monitor and control communication links of local networks 120 associated with the network overlay 130. An example of a local network 120 may be an HF radio network, a 5G radio network, a WI-FI network, or running an IP-based network protocol. Some networks 120 may be more complex to manage compared to other networks. For example, an HF radio network may be more complex to manage than a direct IP wired connection between two points. In some embodiments, a level of complexity of the link monitor 150 may be based on a level of complexity needed to manage the network. For example, the link monitor 150 may implement a simple ping-based link state awareness for generic WAN (i.e. a traversable IP network with a known set of connected hosts) or may implement full ad-hoc networking via OLSR for HF networks. Thus, regardless of the complexity of the network 120, the link monitor 150 of a network overlay 130 associated with the network 120 may monitor and control quality of service features of the network 120. In some embodiments, additional link monitors 150 may be dynamically added to a network overlay 130 to monitor a new network as it becomes available.

In some embodiments, an OLSR-based protocol may be implemented in a link monitor 150. The OLSR-based protocol may be configured to handle an ad-hoc network such as an HF network. The OLSR-based protocol may be configured to identify quality of service features, identify possible routes for communication links, identify a status of the quality of service features of the local network, and then translate the identified information into quality and topology information to a corresponding router 170 to generate a corresponding routing table.

In some embodiments, a link monitor 150 may be configured to operate with a specific network type. If multiple network types are available, then the network overlay 130 may include a link monitor 150 for each network type. For example, a first OLSR-based protocol may be implemented in a first link monitor 150 associated with an HF network and a second OLSR-based protocol may be implemented in a second link monitor 150 associated with a satellite network. In some embodiments, the first OLSR-based protocol and the second OLSR-based protocol may communicate network link-specific information to the router 170 of the network overlay 130.

In some embodiments, the router 170 may be configured as a central point of intelligence configured to collect information across the heterogeneous links, and then actuate based on the collected information as well as based on its own local information. In some embodiments, the router 170 may be configured to include intelligence for directing data over the various communication paths according to user-defined priorities (such as ensuring delivery of priority users and maintaining latency over other network characteristics). In some embodiments, the router 170 may be configured to make decisions on routing and link usage based on the employed communication links, alternate communication links, the quality of service of the communication links, and based on application data that is intended to pass through the network.

In some embodiments, the router 170 may be configured to facilitate quality of service decision-making. The quality of service decision-making may include determining whether application-specific quality of service features are satisfied by the employed communication links. In some embodiments, the router 170 may be configured to incorporate link-layer diagnostic information (such as e.g. latency, throughput, jitter, BER, etc.) and leverage application-layer status (derived from the application 110) via a modular set of algorithmic approaches to calculate costs over the set of local links and generate live route updates. The diagnostic information may be provided to the control module 140 for use in generating updates. In some embodiments, a combination of link-layer diagnostics, application-layer status, and a determination of which channels are occupied based on received data over a network may inform the various algorithms and lead to route updates.

In some embodiments, the router 170 may be configured to facilitate make-before-break protocols. In some embodiments, the router 170 may be configured to monitor the quality of service at a pre-determined frequency. In some embodiments, the pre-determined frequency may be how often a channel is probed for a status update or how often updates may be received from remote link monitors. In some embodiments, the pre-determined frequency may be application dependent, determined by acceptable overhead, or based on a requisite for responsiveness. When the monitored quality of service drops below a nominal value, the router 170 may be configured to automatically determine which other communication links to incorporate to keep the quality of service at or above the nominal value. In some embodiments, the router 170 may receive instructions from a user to incorporate other communication links to keep the quality of service at or about the nominal value. The other links may be incorporated while the original communication links are still implemented by the network. In some embodiments, the router 170 may be automatically disconnected from the original communication links after incorporating the new links. In some embodiments, a user may indicate when the system 100 should disconnect from the original communication links. If there is an indication that a user is present and a pre-determined time has passed at which point the original communication links have degraded beyond usability, then the system 100 will automatically disconnect from the original communication links.

Figure 2:
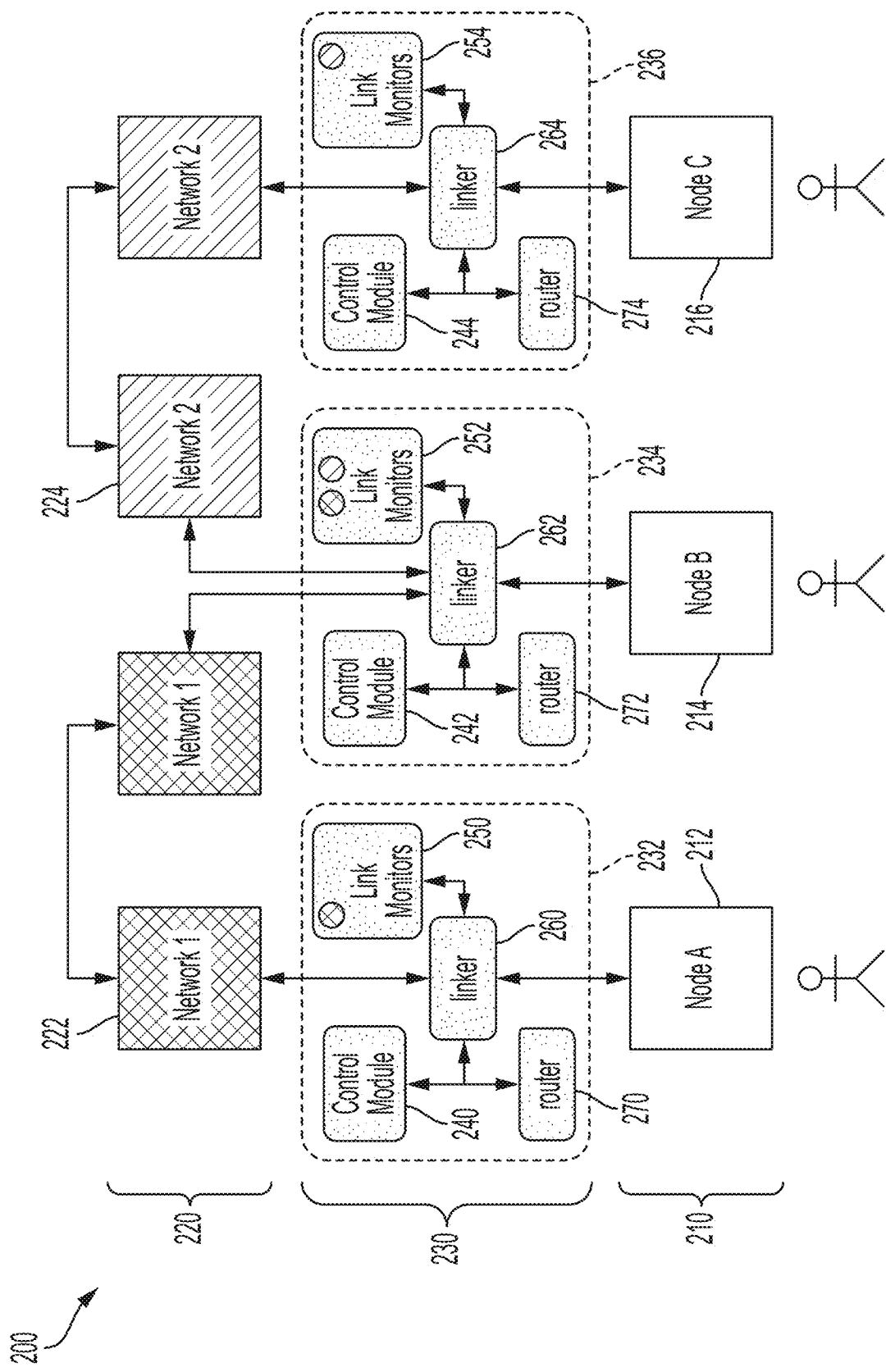
FIG. 2 illustrates an exemplary schematic of a system that shows how data may be routed between a plurality of nodes using one or more networks and a plurality of network overlays, according to some embodiments

FIG. 2 illustrates an exemplary schematic of a system 200 that shows how data may be routed between a plurality of nodes 210 using one or more networks 220 and a plurality of network overlays 230, according to some embodiments. In some embodiments, the plurality of nodes 210 may correspond to users having communication devices configured to connect to one or more networks 220, according to some embodiments. In some embodiments, system 200 may be an expansion of system 100 since system 200 includes a plurality of network overlays 230, whereas system 100 depicts a single network overlay 130. Each network overlay 232, 234, 236 of system 200 may include its own control module 240, 242, 244, one or more link monitors 250, 252, 254, linker 260, 262, 264, and router 270, 272, 274.

In system 200, each network overlay 232, 234, 236 may be configured to correspond to a connection between a node 212, 214, 216 and the one or more networks 222, 224. In some embodiments, the network overlays 230 may be configured to control connections between the nodes 210 and the local networks 220 to sustain a pre-determined level of communication quality for users throughout a duration of a conference communication. The pre-determined level of communication quality may include network specifications (such as one or more of packet error rate, latency, throughput, and jitter configured to maintain a level of quality during the conference) set by a conference application implemented at each node 212, 214, 216. In some embodiments, the network specifications may ensure quality communication amongst the users at each node 212, 214, 216. In some embodiments, a node may be connected to one or more networks via a network overlay. For example, as show in FIG. 2, a first network overlay 232 may be associated with a first local network 222, a second network overlay 234 may be associated with a second local network 224 and the first local network 222, and a third network overlay 236 may be associated with the second local network 224.

In some embodiments, a first control module 240 of a first network overlay 230 may be configured to control communication between remote nodes based on messages and data received from a first node 212 via a first linker 260. The first control module 240 may be configured to respond to received messages and data by sending packets to external nodes 214, 216 via the first linker 260 of the first network overlay 232. The packets may include link availability and status information. The first linker 260 may be configured to transmit the packets to the appropriate nodes based on a routing table provided by router 270. The routing table may, for example, include instructions for the first linker 260 to route the packets to a second linker 262 of the second network overlay 234 via the first network 222 and to a third linker 264 of a third network overlay 236 via the first network 222 and a second network 224. In the example of FIG. 2, packets from node 212 to node 216 may be routed through node 214. That is, in the example of FIG. 2, node 214 is an intermediary node that is configured to bridge communication networks between nodes 212 and node 216. In some embodiments, the router 270 may select node 214 as an intermediary node. In some embodiments, a network overlay 234 associated with an intermediary node 214 includes a plurality of link monitors 252. Each link monitor of the plurality of link monitors 252 may be configured to monitor one of the networks 222, 224 being bridged by the intermediary node 214.

Similar to the description of FIG. 1 above, the routing table may be based on connection quality collected by the first link monitor 250. In some embodiments, the link monitor 250 of the first network overlay 232 may be configured to inform the first router 270 of link-specific network metrics associated with quality of service features and receive packets associated with quality of service of remote networks. For more details regarding the router 270, link monitor 250, linker 260, and the control module 240, please see the description provided in reference to FIG. 1.

In some embodiments, the first router 270 may be configured to receive messages from external nodes 214, 216 via linker 260. The messages received from external nodes 214, 216 may include an indication of which communication technology is being implemented by the external nodes 214, 216. The first router 270 may update its internal topology of the local networks based on the received messages from the external nodes 214, 216.

Figure 3:
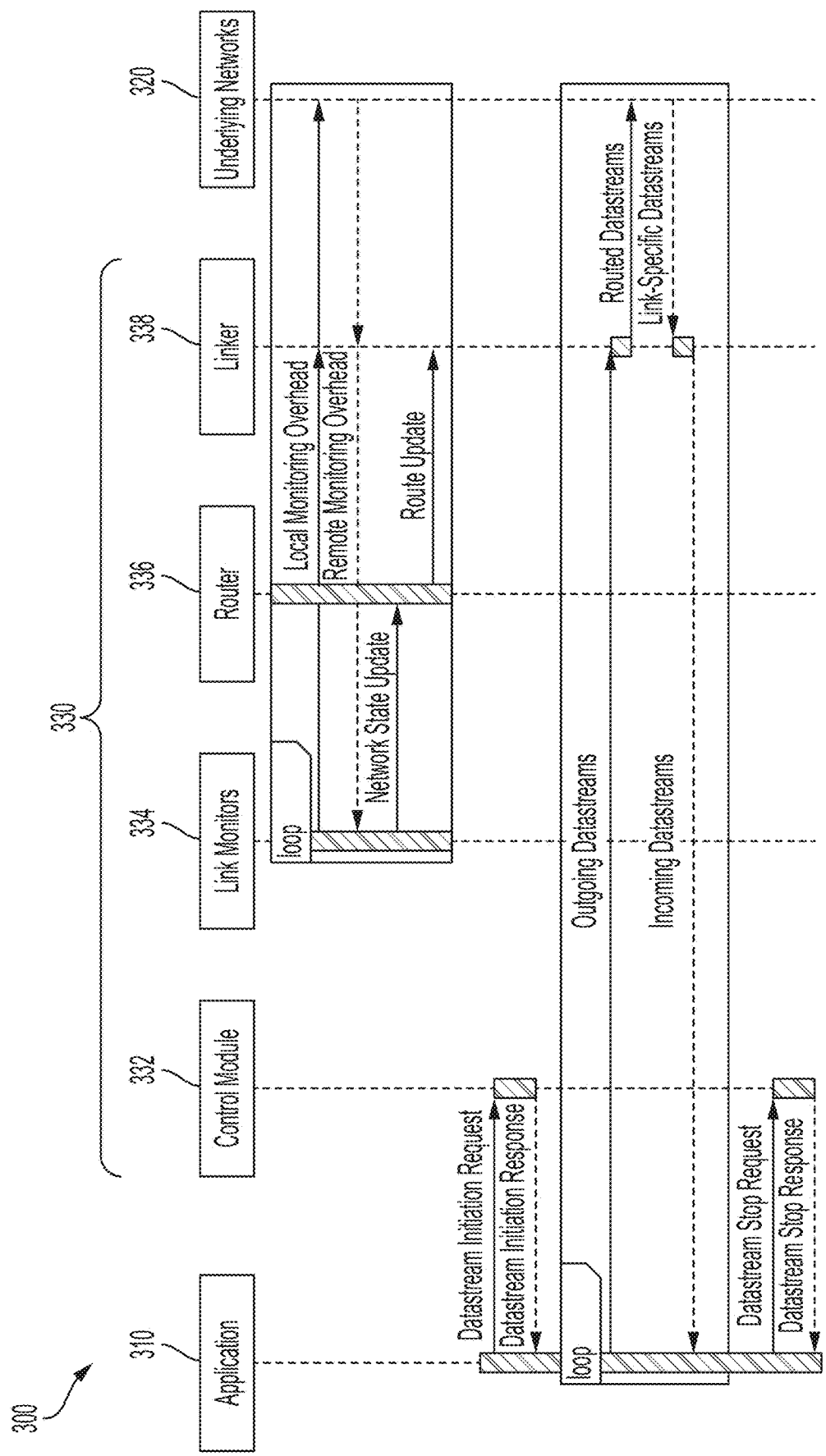
FIG. 3 illustrates an exemplary schematic of exemplary incoming and outgoing messages and signals between an application and local networks via modules of a network overlay, according to some embodiments.

FIG. 3 illustrates an exemplary schematic 300 of exemplary incoming and outgoing messages and signals between an application 310 and local networks 320 via modules of a network overlay 330, according to some embodiments. The modules of the network overlay 330 may include, for example, control module 332, one or more link monitors 334, linker 338, and router 336.

In some embodiments, data streams configured to initiate or stop a conference communication may pass between an application 310 and a control module 232. In some embodiments, an application 310 may transmit outgoing data streams to a linker 338 of a network overlay 330. The linker 338 may route the received data streams from the application 310 to appropriate networks 330 and may receive corresponding link-specific data streams from the networks 320. The received link-specific data streams may be transmitted by the linker 338 to the application 310.

In some embodiments, link monitors 334 may be configured to transmit updates indicating a health of the network to a router 336, monitor local overhead of one or more local networks 320, transmit the local monitored overhead information to remote networks, and to receive local monitored overhead information corresponding to remote networks from network overlays of the remote networks. In some embodiments, the router 336 may be configured to provide routing tables for directing the updates and overhead information.

FIG. 4 shows an exemplary flowchart of an exemplary method 400 of sustaining a network for resilient communications, according to some embodiments. At step 410, a plurality of network overlays (such as network overlays 230) may be initialized. In some embodiments, each network overlay includes one or more link monitors (such as link monitors 150, 250), a control module (such as control module 140, 250), a linker (such as linker 160, 260), and a router (such as router 170, 270). In some embodiments, each network overlay may be associated with a communication device configured to connect to one or more local networks (such as networks 120, 220) via one or more communication links. In some embodiments, each local network may be monitored via a corresponding link monitor. In some embodiments, a communication device may be a node within the network.

At step 420, link monitors of the network overlay may be instantiated. In some embodiments, the link monitors may be configured to monitor the communication links to inform network topology and gather link quality metrics. The gathered information may be used to determine if the communication link satisfies application-specific metrics. The application-specific metrics may include pre-determined quality thresholds for quality of service features. In some embodiments, each node may be aware of the potential connections available to the application for each neighboring node. For example, in the exemplary system of FIG. 2, node 212 may be aware that nodes 214, 216 exist across its underlying networks. At step 430, communication link topology may be monitored via the link monitors.

At step 440, the communication link topology and the quality metrics may be received at a router. At step 450, routing tables may be determined at the router. The routing tables may be based on the communication link topology and the quality metrics received from the link monitors. The routing table may include optimal next-hop connections for each possible destination. In some embodiments, the routing table of each network overlay may include routing options associated with the router's local node and routing options associated with external nodes. Step 440 may be iterated for a lifetime of the network overlay.

At step 460, a linker may receive control messages from a conference application. At step 470, the linker may pass the control messages to a control module. In some embodiments, a conference application may request a control message to be exchanged to start a dataflow of the application. For example, if the application must initiate a conference communication (such as a call) via control messages, then the linker may receive a control message and the linker may pass the control message to the control module. If the application requests a response to the control messages to initiate a conference communication, the control module may respond via the linker. In the example of FIG. 2, node 212 may initiate a dataflow to nodes 214, 216. In some embodiments, the dataflow of the application may immediately start without an exchange of control messages.

At step 480, application data may be received at the linker. The application data may be checked to determine its next destination. The next destination may be referenced against the local node's routing table. The routing table may determine the local network to transmit the application data.

At step 490, the application data may be received by another local network and passed to the linker of the network overlay associated with that other local network. In some embodiments, the other network may be connected an intermediary node. In the example of FIG. 2, node 214 is an intermediary node. In some embodiments, the linker at the intermediary node may detect multiple possible destinations, including the node from which the application data was received. In some embodiments, the application data may be passed out of the linker, out of the network overlay, and to the local application of the intermediary node (for example, node 214). In some embodiments, the application data may be copied and passed to the other local networks based on the routing table entry for the secondary destination of the application data. In the example of FIG. 2, the secondary destination is node 216.

At step 495, the linker associated with the secondary destination may detect that the application data is destined for a node associated with the secondary destination and transmit the application data to the node associated with the secondary destination. For example, as shown in FIG. 2, the linker of node 216 may detect that the application data received from node 214 may be destined for the application associated with node 216. The linker of node 216 may forward the received data out of the network overlay of node 216 to the application associated with node 216.

FIG. 5 illustrates an exemplary flowchart of an exemplary method 500 for sustaining a communications network, according to some embodiments. The method may be configured to provide quality communication amongst a plurality of participants (such as participants at nodes 210) of a conferencing application (such as application 110). At step 510, employed communication links between communication devices and local networks associated with the communications network may be monitored.

At step 520, it is determined whether employed communication links and whether alternate communication links satisfy a pre-determined quality level (such as quality of service threshold) of the conference application. At step 530, if one or more of the employed communication links is determined to not satisfy the pre-determined quality level, then one or more alternate communication links that are determined to satisfy the pre-determined quality level may be connected.

FIG. 6 illustrates an example of a computing device 600 in accordance with some embodiments (such as system 100, 200), or a computing device for implementing methods 400 and 500). Device 600 can be a host computer connected to a network. Device 600 can be a client computer or a server. As shown in FIG. 6, device 600 can be any suitable type of microprocessor-based device, such as a personal computer, workstation, server, or handheld computing device (portable electronic device) such as a phone or tablet. The device can include, for example, one or more of processor 610, input device 620, output device 630, storage 640, and communication device 660. Input device 620 and output device 630 can generally correspond to those described above and can either be connectable or integrated with the computer.

Input device 620 can be any suitable device that provides input, such as a touch screen, keyboard or keypad, mouse, or voice-recognition device. Output device 630 can be any suitable device that provides output, such as a touch screen, haptics device, or speaker.

Storage 640 can be any suitable device that provides storage, such as an electrical, magnetic, or optical memory including a RAM, cache, hard drive, or removable storage disk. Communication device 660 can include any suitable device capable of transmitting and receiving signals over a network, such as a network interface chip or device. The components of the computer can be connected in any suitable manner, such as via a physical bus or wirelessly.

Software 650, which can be stored in storage 640 and executed by processor 610, can include, for example, the programming that embodies the functionality of the present disclosure (e.g., as embodied in the devices as described above).

Software 650 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 640, that can contain or store programming for use by or in connection with an instruction execution system, apparatus, or device.

Software 650 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate or transport programming for use by or in connection with an instruction execution system, apparatus, or device. The transport readable medium can include, but is not limited to, an electronic, magnetic, optical, electromagnetic, or infrared wired or wireless propagation medium.

Device 600 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Device 600 can implement any operating system suitable for operating on the network. Software 650 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

The invention claimed is:

1. A system for establishing and maintaining a conference communication between a plurality of users of at least one conference application, comprising:
   one or more processors;
   memory;
   one or more programs configured for execution by the one or more processors, the one or more programs including instructions for:
      receiving a first set of data associated with a first set of communication links of one or more local networks associated with a communications network, wherein the first set of communication links is configured to establish connections between a plurality of communication devices of the plurality of users of the at least one conference application for accessing the conference communication via the at least one conference application;
      receiving a second set of data associated with a second set of communication links;
      determining whether one or more communication links of the first set of communication links satisfy a pre-determined quality level defined, at least in part, by the at least one conference application;
      determining whether one or more communication links of the second set of communication links satisfy the pre-determined quality level defined, at least in part, by the at least one conference application;
      selecting one or more communication links of the second set of communication links that have been determined to satisfy the pre-determined quality level defined, at least in part, by the at least one conference application; and
      connecting the plurality of communication devices of the plurality of users of the at least one conference application via the selected one or more communication links that have been determined to satisfy the pre-determined quality level of the second set of communication links if one or more communication links of the first set of communication links is determined to not satisfy the pre-determined quality level such that the conference communication between the plurality of users of the at least one conference application is maintained in accordance with the pre-determined quality level defined, at least in part, by the at least one conference application, wherein the determination of whether one or more communication links of the second set of communication links satisfy the pre-determined quality occurs prior to connecting the plurality of communication devices via the selected one or more communications links.

2. The system of claim 1, wherein the first set of communication links and the second set of communication links are associated with a plurality of different communication technologies.

3. The system of claim 2, wherein the plurality of different communication technologies includes one or more of high frequency (HF) communication technology, 4G radio communication technology, 5G radio communication technology, WI-FI communication technology, and an IP-based network protocol communication technology.

4. The system of claim 1, wherein the selection of the one or more communication links of the second set of communication links is configured to maximize a communications network quality based on the determination of whether the one or more communication links of the first set of communication links and the one or more communication links of the second set of communication links satisfy the pre-determined quality level.

5. The system of claim 1, wherein connecting the plurality of communication devices of the plurality of users of the at least one conference application via the selected one or more communication links of the second set of communication links includes implementing a make-before-break protocol that connects the plurality of communication devices via the selected one or more communication links of the second set of communication links before disconnecting the one or more communication links of the first set of communication links that have been determined to not satisfy the pre-determined quality level.

6. The system of claim 5, wherein the first set of communication links are actively being used by the plurality of communication devices and the second set of communication links are not actively being used by the plurality of communication devices until the make-before-break protocol is implemented.

7. The system of claim 1, further comprising: upon connecting the plurality of communication devices of the plurality of users of the at least one conference application via the selected one or more communication links of the second set of communication links, transmitting application data via the selected one or more communication links of the second set of communication links.

8. The system of claim 1, wherein connecting the plurality of communication devices of the plurality of users of the at least one conference application via the selected one or more communication links of the second set of communication links establishes communication amongst the plurality of communication devices using a plurality of different communication technologies associated with one or more of the local networks.

9. The system of claim 1, wherein the one or more programs include instructions for disconnecting the plurality of communication devices of the plurality of users of the at least one conference application from the one or more communication links of the first communication links that have been determined to not satisfy the pre-determined quality level after connecting the plurality of communication devices via the selected one or more communication links of the second set of communication links.

10. The system of claim 1, wherein the determination of whether the one or more communication links of the first set of communication links satisfy the pre-determined quality level includes an assessment of whether the one or more communication links of the first set of communication links are degrading towards a level below the pre-determined quality level.

11. The system of claim 1, wherein the pre-determined quality level includes network specifications that allow a conferencing application to operate as intended.

12. The system of claim 1, wherein the pre-determined quality level includes thresholds for quality of service features for conferencing, and wherein the quality of service features include one or more of packet error rate, latency, throughput, and jitter.

13. The system of claim 1, comprising a plurality of network overlays, wherein each communication device of the plurality of communication devices is associated with a network overlay of the plurality of network.

14. The system of claim 13, wherein each network overlay includes a linker, a router, one or more link monitors, and a control module.

15. The system of claim 14, wherein the linker is configured to receive the first set of data, the second set of data, and the pre-determined quality level.

16. The system of claim 14, wherein the linker is configured to: receive application data, receive conference quality data associated with the monitored quality of service features from the one or more link monitors, transmit the conference quality data to the router configured to select if one or more communication links should be used based on conference quality data and to generate a routing table based on the selection, receive the routing table from the router, and transmit the application data to a next destination based on the routing table.

17. The system of claim 14, wherein the linker is configured to receive quality data from the one or more link monitors, wherein the quality data received from the one or more link monitors is associated with performance of the first set of communication links and performance of the second set of communication links based on quality of service features, and wherein the quality of service features include one or more of packet error rate, latency, throughput, and jitter.

18. The system of claim 14, wherein the linker is configured to receive application data and transmit the application data to another linker of another network overlay via one or more communication links from the first set of communication links or the second set of communication links.

19. The system of claim 14, wherein the linker is configured to receive control messages from outside the network overlay, pass the control messages to the control module, receive a response to the control messages from control module, and transmit the response outside the network overlay.

20. The system of claim 14, wherein the network overlay is configured to dynamically add one or more additional link monitors to monitor one or more other local networks as they become available.

21. A method for establishing and maintaining a conference communication between a plurality of users of at least one conference application, comprising:

receiving a first set of data associated with a first set of communication links of one or more local networks associated with a communications network, wherein the first set of communication links is configured to establish connections between a plurality of communication devices of the plurality of users of the at least one conference application for accessing the conference communication via the at least one conference application;

receiving a second set of data associated with a second set of communication links;

determining whether one or more communication links of the first set of communication links satisfy a pre-determined quality level defined, at least in part, by the at least one conference application;

determining whether one or more communication links of the second set of communication links satisfy the pre-determined quality level defined, at least in part, by the at least one conference application;

selecting one or more communication links of the second set of communication links that have been determined to satisfy the pre-determined quality level defined, at least in part, by the at least one conference application; and connecting the plurality of communication devices of the plurality of users of the at least one conference application via the selected one or more communication links that have been determined to satisfy the pre-determined quality level of the second set of communication links if one or more communication links of the first set of communication links is determined to not satisfy the pre-determined quality level such that the conference communication between the plurality of users of the at least one conference application is maintained in accordance with the pre-determined quality level defined, at least in part, by the at least one conference application, wherein the determination of whether one or more communication links of the second set of communication links satisfy the pre-determined quality occurs prior to connecting the plurality of communication devices via the selected one or more communications links.

22. The method of claim 21, wherein the first set of communication links and the second set of communication links are associated with a plurality of different communication technologies.

23. The method of claim 22, wherein the plurality of different communication technologies includes one or more of high frequency (HF) communication technology, 4G radio communication technology, 5G radio communication technology, WI-FI communication technology, and an IP-based network protocol communication technology.

24. The method of claim 21, wherein the selection of the one or more communication links of the second set of communication links is configured to maximize a communications network quality based on the determination of whether the one or more communication links of the first set of communication links and the one or more communication links of the second set of communication links satisfy the pre-determined quality level.

25. The method of claim 21, wherein connecting the plurality of communication devices of the plurality of users of the at least one conference application via the selected one or more communication links of the second set of communication links includes implementing a make-before-break protocol that connects the plurality of communication devices via the selected one or more communication links of the second set of communication links before disconnecting the one or more communication links of the first set of communication links that have been determined to not satisfy the pre-determined quality level.

26. The method of claim 25, wherein the first set of communication links are actively being used by the plurality of communication devices and the second set of communication links are not actively being used by the plurality of communication devices until the make-before-break protocol is implemented.

27. The method of claim 21, further comprising: upon connecting the plurality of communication devices of the plurality of users of the at least one conference application via the selected one or more communication links of the second set of communication links, transmitting application data via the selected one or more communication links of the second set of communication links.

28. The method of claim 21, wherein connecting the plurality of communication devices of the plurality of users of the at least one conference application via the selected one or more communication links of the second set of communication links establishes communication amongst the plurality of communication devices using a plurality of different communication technologies associated with one or more of the local networks.

29. The method of claim 21, comprising disconnecting the plurality of communication devices of the plurality of users of the at least one conference application from the one or more communication links of the first communication links that have been determined to not satisfy the pre-determined quality level after connecting the communication devices via the selected one or more communication links of the second set of communication links.

30. The method of claim 21, wherein the determination of whether the one or more communication links of the first set of communication links satisfy the pre-determined quality level includes an assessment of whether the one or more communication links of the first set of communication links are degrading towards a level below the pre-determined quality level.

31. The method of claim 21, wherein the pre-determined quality level includes network specifications that allow a conferencing application to operate as intended.

32. The method of claim 21, wherein the pre-determined quality level includes thresholds for quality of service features for conferencing, and wherein the quality of service features include one or more of packet error rate, latency, throughput, and jitter.

33. The method of claim 21, wherein each communication device of the plurality of communication devices is associated with a network overlay of a plurality of network overlays.

34. The method of claim 33, wherein each network overlay includes a linker, a router, one or more link monitors, and a control module.

35. The method of claim 34, wherein the linker is configured to receive the first set of data, the second set of data, and the pre-determined quality level.

36. The method of claim 34, wherein the linker is configured to: receive application data, receive conference quality data associated with the monitored quality of service features from the one or more link monitors, transmit the conference quality data to the router configured to select if one or more communication links from the second set of communication links should be used based on conference quality data and to generate a routing table based on the selection, receive the routing table from the router, and transmit the application data to a next destination based on the routing table.

37. The method of claim 34, wherein the linker is configured to receive quality data from the one or more link monitors, wherein the quality data received from the one or more link monitors is associated with performance of the first set of communication links and performance of the second set of communication links based on quality of service features, and wherein the quality of service features include one or more of packet error rate, latency, throughput, and jitter.

38. The method of claim 34, wherein the linker is configured to receive application data and transmit the application data to another linker of another network overlay via one or more communication links from the first set of communication links or the second set of communication links.

39. The method of claim 34, wherein the linker is configured to receive control messages from outside the network overlay, pass the control messages to the control module, receive a response to the control messages from control module, and transmit the response outside the network overlay.

40. The method of claim 34, wherein the network overlay is configured to dynamically add one or more additional link monitors to monitor one or more other local networks as they become available.

41. A non-transitory computer readable storage medium storing one or more programs, the one or more programs configured to establish and maintain a conference communication between a plurality of users of at least one conference application, the one or more programs comprising instructions, which when executed by an electronic device, cause the device to:
 receive a first set of data associated with a first set of communication links of one or more local networks associated with a communications network, wherein the first set of communication links is configured to establish connections between a plurality of communication devices of the plurality of users of the at least one conference application for accessing the conference communication via the at least one conference application;
 receive a second set of data associated with a second set of communication links;
 determine whether one or more communication links of the first set of communication links satisfy a pre-determined quality level defined, at least in part, by the at least one conference application;
 determine whether one or more communication links of the second set of communication links satisfy the pre-determined quality level defined, at least in part, by the at least one conference application;
 select one or more communication links of the second set of communication links that have been determined to satisfy the pre-determined quality level defined, at least in part, by the at least one conference application; and connect the plurality of communication devices of the plurality of users of the at least one conference application via the selected one or more communication links that have been determined to satisfy the pre-determined quality level of the second set of communication links if one or more communication links of the first set of communication links is determined to not satisfy the pre-determined quality level such that the conference communication between the plurality of users of the at least one conference application is maintained in accordance with the pre-determined quality level defined, at least in part, by the at least one conference application, wherein the determination of whether one or more communication links of the second set of communication links satisfy the pre-determined quality occurs prior to connecting the plurality of communication devices via the selected one or more communications links.

42. The non-transitory computer readable storage medium of claim 41, wherein the first set of communication links and the second set of communication links are associated with a plurality of different communication technologies.

43. The non-transitory computer readable storage medium of claim 42, wherein the plurality of different communication technologies includes one or more of high frequency (HF) communication technology, 4G radio communication technology, 5G radio communication technology, WI-FI communication technology, and an IP-based network protocol communication technology.

44. The non-transitory computer readable storage medium of claim 41, wherein the selection of the one or more communication links of the second set of communication links is configured to maximize a communications network quality based on the determination of whether the one or more communication links of the first set of communication links and the one or more communication links of the second set of communication links satisfy the pre-determined quality level.

45. The non-transitory computer readable storage medium of claim 41, wherein the connection of the plurality of communication devices of the plurality of users of the at least one conference application via the selected one or more communication links of the second set of communication links includes implementation of a make-before-break protocol that connects the plurality of communication devices via the selected one or more communication links of the second set of communication links before disconnection of the one or more communication links of the first set of communication links that have been determined to not satisfy the pre-determined quality level.

46. The non-transitory computer readable storage medium of claim 45, wherein the first set of communication links are actively being used by the plurality of communication devices and the second set of communication links are not actively being used by the plurality of communication devices until the make-before-break protocol is implemented.

47. The non-transitory computer readable storage medium of claim 41, wherein upon the connection of the plurality of communication devices of the plurality of users of the at least one conference application via the selected one or more communication links of the second set of communication links, application data is transmitted via the selected one or more communication links of the second set of communication links.

48. The non-transitory computer readable storage medium of claim 41, wherein the connection of the plurality of communication devices of the plurality of users of the at least one conference application via the selected one or more communication links of the second set of communication links establishes communication amongst the plurality of communication devices using a plurality of different communication technologies associated with one or more of the local networks.

49. The non-transitory computer readable storage medium of claim 41, wherein the one or more programs comprises instructions, which when executed by an electronic device, cause the device to disconnect the plurality of communication devices of the plurality of users of the at least one conference application from the one or more communication links of the first communication links that have been determined to not satisfy the pre-determined quality level after connection of the communication devices via the selected one or more communication links of the second set of communication links.

50. The non-transitory computer readable storage medium of claim 41, wherein the determination of whether the one or more communication links of the first set of communication links satisfy the pre-determined quality level includes an assessment of whether the one or more communication links of the first set of communication links are degrading towards a level below the pre-determined quality level.

51. The non-transitory computer readable storage medium of claim 41, wherein the pre-determined quality level includes network specifications that allow a conferencing application to operate as intended.

52. The non-transitory computer readable storage medium of claim 41, wherein the pre-determined quality level includes thresholds for quality of service features for conferencing, and wherein the quality of service features include one or more of packet error rate, latency, throughput, and jitter.

53. The non-transitory computer readable storage medium of claim 41, wherein each communication device of the plurality of communication devices is associated with a network overlay of a plurality of network overlays.

54. The non-transitory computer readable storage medium of claim 53, wherein each network overlay includes a linker, a router, one or more link monitors, and a control module.

55. The non-transitory computer readable storage medium of claim 54, wherein the linker is configured to receive the first set of data, the second set of data, and the pre-determined quality level.

56. The non-transitory computer readable storage medium of claim 54, wherein the linker is configured to: receive application data, receive conference quality data associated with the monitored quality of service features from the one or more link monitors, transmit the conference quality data to the router configured to select if one or more communication links from the second set of communication links should be used based on conference quality data and to generate a routing table based on the selection, receive the routing table from the router, and transmit the application data to a next destination based on the routing table.

57. The non-transitory computer readable storage medium of claim 54, wherein the linker is configured to receive quality data from the one or more link monitors, wherein the quality data received from the one or more link monitors is associated with performance of the first set of communication links and performance of the second set of communication links based on quality of service features, and wherein the quality of service features include one or more of packet error rate, latency, throughput, and jitter.

58. The non-transitory computer readable storage medium of claim 54, wherein the linker is configured to receive application data and transmit the application data to another linker of another network overlay via one or more communication links from the first set of communication links or the second set of communication links.

59. The non-transitory computer readable storage medium of claim 54, wherein the linker is configured to receive control messages from outside the network overlay, pass the control messages to the control module, receive a response to the control messages from control module, and transmit the response outside the network overlay.

60. The non-transitory computer readable storage medium of claim 54, wherein the network overlay is configured to dynamically add one or more additional link monitors to monitor one or more other local networks as they become available.

61. The system of claim 1, wherein the plurality of users use the same conference application.

62. The system of claim 1, wherein the plurality of communication devices of the plurality of users of the conference application comprises:

a first communication device of a first user of the conference application, the first communication device employing a first communication technology, a second communication device of a second user of the conference application, the second communication device employing a second communication technology not employed by the first communication device, and a third communication device of a third user of the conference application, the third communication employing the first and second communication technologies, wherein the selected one or more communication links are configured to connect the first communication device and the second communication device via the third communication device.

\* \* \* \* \*